Oct. 11, 1949.                 H. A. WINTERMUTE                 2,484,202
                                GAS TESTING DEVICE
Filed July 29, 1946                                          2 Sheets-Sheet 1
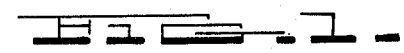
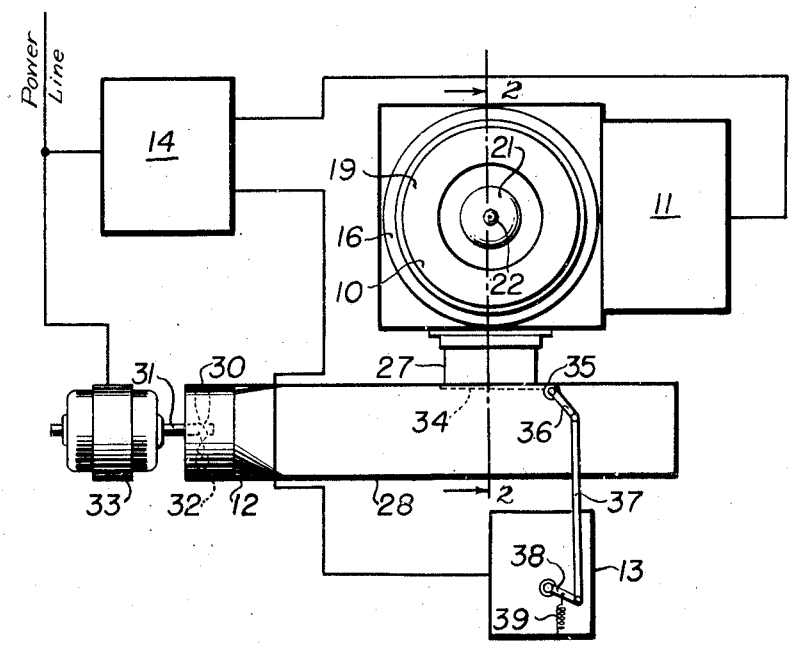
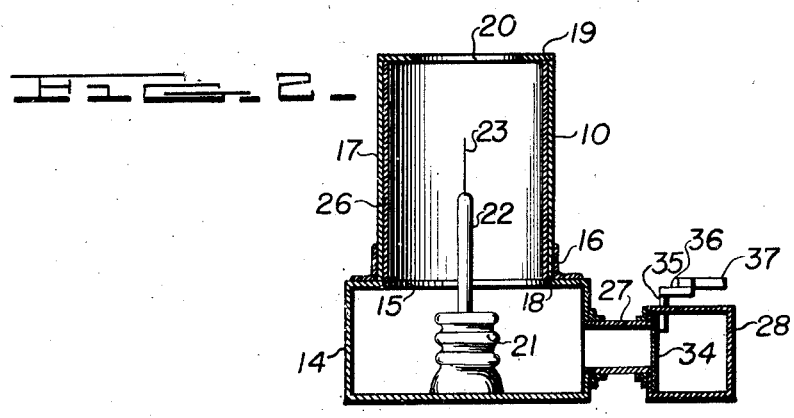
Inventor
Harry A. Wintermute
By Stowell & Evans
Attorneys Oct. 11, 1949.  H. A. WINTERMUTE  2,484,202
GAS TESTING DEVICE
Filed July 29, 1946  2 Sheets-Sheet 2
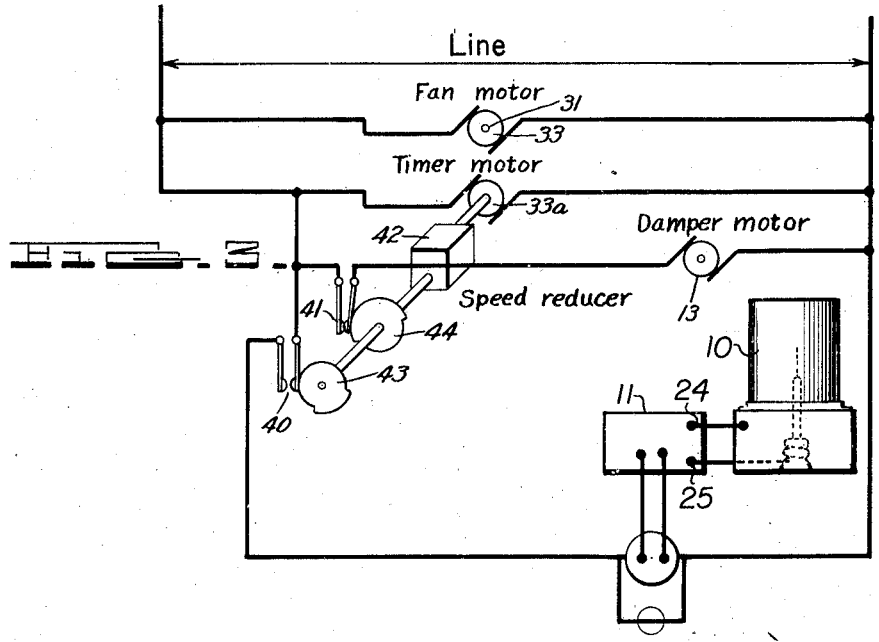
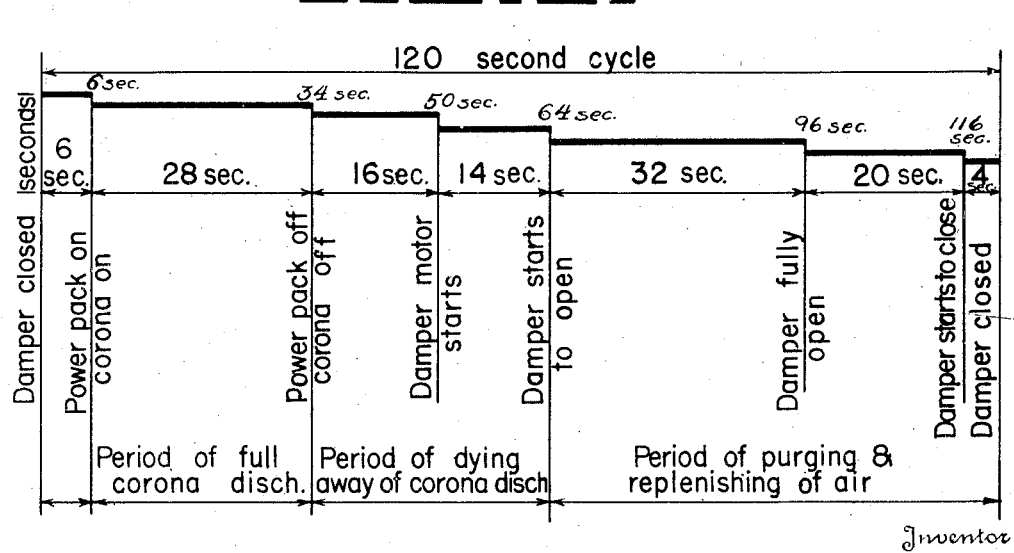
Inventor
Harry A. Wintermute
By Stowell + Evans
Attorneys Patented Oct. 11, 1949

2,484,202

UNITED STATES PATENT OFFICE 2,484,202

GAS TESTING DEVICE

Harry A. Wintermute, Plainfield, N. J., assignor to Research Corporation, New York, N. Y., a corporation of New York Application July 29, 1946, Serial No. 686,974

7 Claims. (Cl. 73—28)

This invention relates to a testing device and more particularly to a device for obtaining a test precipitate or deposit of suspended matter from a determinable sample of gas.

The device of the invention finds particular application in the testing of air to determine the nature and amounts of material suspended therein, but is suitable for the testing of other gases as well.

Objects of the invention are to provide an improved device of the type in question utilizing principles of electrical precipitation to collect a precipitate of suspended matter from a sample of air; to provide a fully automatic testing device in the use of which the size of gas sample treated may be determined with a high degree of accuracy; to provide a testing device wherein a high percentage or substantially all of the suspended matter is precipitated from the gas sample; to provide, in such a device, means whereby a precipitate-collecting mat may be conveniently placed in and removed from the device; and to provide in the device simple and effective time-controlled means for its automatic operation.

It is also an object of the invention to provide a superior and efficient process for obtaining a test precipitate of suspended matter from an accurately determined sample of air or other gas.

Another object is to provide a device for obtaining a test deposit upon a collecting mat whereby examination and appraisal of the deposit is facilitated. The collecting mats upon which the device of the invention is adapted to deposit suspended matter can be readily removed from the device in condition for weighing and microscopic examination or culturing, if biotic in nature.

In a typical embodiment, the invention takes the form of a device for obtaining a test precipitate of suspended matter from a determinable sample of gas including an electrical precipitator having complementary electrodes defining a precipitating zone therebetween, means for establishing a succession of stationary gas samples in the precipitating zone, and means for impressing an electric potential between the electrodes when the gas samples are in the precipitating zone. The electrical precipitator incorporated in the device specifically takes the form of a single-stage precipitator having a single pair of complementary electrodes, the extended surface electrode of the complementary pair being provided by the walls of the precipitator housing. Means is also provided permitting ready access to the interior of the precipitator for the introduction and removal of a precipitate-collecting mat.

The means for establishing a succession of stationary gas samples in the precipitator preferably includes a continuously-acting gas suction device or aspirator normally tending to draw a stream of gas through the precipitating zone and a damper arranged to be intermittently opened and closed to permit periodic purging of the precipitating zone and replacement of the gas sample from which suspended matter has been precipitated with a fresh sample.

There is also preferably provided in the device of the invention means interconnected with the means for establishing the succession of stationary gas samples for actuating the electric potential impressing means only when discrete gas samples are at rest in the precipitating zone.

In its method aspects, the invention includes a process for obtaining a test precipitate of suspended matter from a determinable sample of gas which comprises establishing a succession of stationary gas samples in a precipitating zone and establishing an electric precipitating field in said precipitating zone when said samples are in said zone.

For the purpose of more particularly pointing out the principles of the invention, reference is made to the accompanying drawing showing an embodiment of the invention and to the following detailed description thereof. In the drawing, Fig. 1 is a semi-diagrammatic plan view of a testing device in accordance with the invention;

Fig. 2 is a vertical sectional view taken along the line 2—2 of Fig. 1;

Fig. 3 is a circuit diagram; and

Fig. 4 is a chart showing a typical cycle of operation.

Referring particularly to Figs. 1 and 2 of the drawing, the testing device shown includes an electrical precipitator 10, a power pack 11 providing high tension current for the complementary electrodes of the precipitator, an aspirating device 12, a damper operating motor 13, a timer 14, and suitable electrical conductors, all to be more fully described hereinafter.

The electrical precipitator 10 has a base 14 of box-like construction having a circular opening 15 at the top. A flanged receptacle 16 is mounted upon the top of the base around the opening 15 to provide for the reception of a cylindrical element 17 which serves not only as a part of the precipitator casing but also as an extended surface electrode. The cylinder 17 is open at the bottom and its bottom edge rests upon a ledge 18, the ledge being a portion of the top of the base 14 projecting inwardly of the flanged receptacle 16. An annular disc 19 is affixed to the top of the cylinder, the opening 20 of the disc giving access to the interior of the precipitator.

Mounted centrally of the base upon an insulator 21 and projecting axially into the cylinder 17 is a discharge electrode 22 having a fine-wire tip or discharge point 23. The center of the discharge point is located at approximately the center of the cylinder 17 to provide relatively uniform corona discharge and precipitating field.

The power pack 11 is of conventional design and provides a source of high potential current for application to the complementary electrodes 17 and 22 defining the precipitating zone. Although not shown in Figs. 1 and 2, the high tension output terminals 24 and 25 of the power pack are connected through appropriate leads to the base 14 of the precipitator and the discharge electrode 22, respectively, as indicated in the circuit diagram of Fig. 3.

An open cylindrical precipitate-collecting mat 26, upon which suspended matter is precipitated, may be inserted in the cylinder 17 during operation of the device. It fits snugly within the cylinder 17 and is easily inserted into and removed from the cylinder which may be detached from its receptacle for this purpose. The mat may be formed from a length of sheet celluloid, paper or other sheet material rolled into cylindrical configuration or it may be molded as an unbroken cylinder from plastic material or otherwise suitably formed.

A gas conduit 27 leads from the base 14 of the precipitator to the exhaust tube 28 of the suction device 12. The exhaust tube may be formed from a length of pipe of square cross section reduced to circular cross section at 30. It is open at both ends, and into the left end projects the shaft 31 carrying an exhaust fan 32, the shaft and fan being driven by the motor 33.

A damper 34 is fixed to a vertical shaft 35 journalled at top and bottom in bearings formed in the pipe 28 in such manner that the damper may be swung to uncover and re-cover the end of conduit 27 by rotating the shaft 35 for the purpose of purging and replenishing gas in the precipitating zone. In its fully open position, the damper effectively blocks the right-hand end of the exhaust tube 28, thus applying the full suction effect of the fan to the precipitator. Conversely, when the damper is fully closed the right-hand end of the tube 28 is open to atmosphere allowing free flow of air through the tube and relieving to a large extent gas pressure differential across the damper and minimizing the tendency for gas to be exhausted from the precipitator. An arm 36 is fixed to the top of shaft 35 and the outer end of the arm is connected by a link 37 to the arm 38 of the damper operating motor 13. A tension spring 39, fixed at one end to the arm 38 and at the other end to the housing of motor 13, normally urges the damper 34 to closed position. It will be seen that counter-clockwise movement of the arm 38 swings the damper to open position.

The timer 14, as will be explained more fully hereinafter, is constructed and arranged to time the opening and closing of the damper and the energization of the power pack in accordance with a preselected cycle of operation.

A typical cycle of operation is illustrated by the chart of Fig. 4. The cycle is of 120 seconds duration and includes a precipitation period during which a quiescent, discrete sample of gas is treated in the precipitation zone to deposit such particulate matter as may be suspended in the sample, and a period during which the precipitating zone is purged of the treated sample and a fresh sample of gas to be treated is introduced into the precipitating zone.

In the chart of Fig. 4, the legends on the vertical lines state the position of the damper or whether the power pack is on or off. Time is indicated as running from left to right, total elapsed time being shown in the top line of figures and time intervals between vertical lines being shown in the second line of figures. The legends on the bottom lines of the chart designate the several periods of the cycle.

The cycle has an initial six second period in which the damper is closed and a fresh sample of gas is at rest in the precipitating zone. At the end of six seconds the power pack is turned on and remains on for twenty-eight seconds for a period of full corona discharge, after which time the power pack is deenergized. Due to the characteristics of the power pack and its association with the precipitator, corona discharge does not cease immediately, but slowly dies away over a period of thirty seconds. About half way through this last mentioned period, the damper operating motor starts; the damper begins to open at the end of this period. The damper is fully open thirty-two seconds after it starts to open; it starts to close in another twenty seconds and is fully closed in an additional four seconds. Thus it will be seen that the period of purging and replenishing of air extends for a period of fifty-six seconds at the end of the cycle.

From the foregoing description of a typical cycle it will be seen that a discrete gas sample is subjected to corona discharge only while it is at rest in the precipitating zone and that no precipitation occurs during purging and replenishment of the gas sample. Since the volume of the precipitating zone can be accurately measured or calibrated, the volume of gas sample treated in one cycle is substantially exactly known and the total volume of gas treated in a plurality of successive cycles can be calculated with a high degree of accuracy.

As will be understood by those skilled in the art, the pollution of ordinary air is measured in parts per million of air and consequently, appreciable deposits of particulate matter can be obtained only from relatively large air volumes. Since it is desirable to obtain the deposit on a small area of test mat to facilitate weighing and examination, air samplers of correspondingly small volume must be run for periods measured in hours or even days to obtain an adequate deposit. The device of the present invention, owing to its ability to precipitate substantially all of the particulate matter from each discrete increment of the total gas sample by subjecting the increment to extended precipitation conditions and to the accuracy with which the total volume of gas sample can be ascertained, provides a very reliable test device.

An exemplary circuit diagram is shown in Fig. 3. As will be understood from the figure, the fan motor 33 runs continuously thereby creating a constant suction in the aspirating device 12. The timer motor 33a also runs continuously, making and breaking the contacts 40 in conventional manner to energize and deenergize the power pack 11 at the desired times. The timer motor similarly actuates the contacts 41 to energize and deenergize the damper motor 13 at the desired times in the cycle of operation. A conventional speed reducer 42 driven by the timer motor 33a drives cams 43 and 44. Cam 43 actuates the contacts 40 to energize and deenergize the power pack 11 and cam 44 actuates the contacts 41 to energize the damper motor in accordance with the selected operating cycle. It will be understood that a conventional drive mechanism, including suitably designed cams, is included in the damper motor housing to actuate the arm 38 to open and close the damper 34 in accordance with the requirements of the selected operating cycle.

The apparatus can be widely applied. In addition to dusts and other suspended solids commonly met with, mists of low vapor pressure liquids can be collected and weighed, and otherwise observed. And, where biotic specimens such as molds and bacteria are to be collected for study, the precipitate-collecting mat can be coated with a medium that will permit subsequent culturing. Tests have proven that the electric discharge used is not lethal to such organisms.

I claim:

1. A device for obtaining a test precipitate of suspended matter from gas which comprises an electrical precipitator including a casing defining a precipitating chamber, the walls of said casing providing an extended surface electrode structure, complementary discharge electrode means positioned in said precipitating chamber, means for impressing an electric potential across said electrodes, gas inlet means opening into said precipitating chamber, opposed gas outlet means for removal of gas from said precipitating chamber, continuously acting gas suction means connected to said gas outlet means, a damper for controlling the flow of gas from said gas outlet means to said gas suction means, time-controlled means for intermittently opening and closing said damper to establish a succession of stationary gas samples in said precipitating chamber and for energizing said electric potential impressing means only when said gas samples are in said chamber, and means for positioning a precipitate-collecting mat in said precipitating chamber adjacent to the walls of said casing.

2. A device for obtaining a test precipitate of suspended matter from gas which comprises an electrical precipitator having complementary extended surface and discharge electrodes defining a precipitating chamber therebetween, means for passing a stream of gas through said precipitating chamber, valve means for interrupting flow of gas through said precipitating chamber, and means including a timing device for operating said valve means and for energizing said complementary electrodes only when said valve means is in closed position to establish a stationary gas sample in said precipitating chamber.

3. A device for obtaining a test precipitate of suspended matter from gas which comprises an electrical precipitator having complementary extended surface and discharge electrodes defining a precipitating chamber therebetween, means for passing a stream of gas through said precipitating chamber, valve means for interrupting flow of gas through said precipitating chamber, and means for cyclically opening and closing said valve means and energizing said complementary electrodes only when said valve means is in closed position to establish a stationary gas sample in said precipitating chamber.

4. A device for obtaining a test precipitate of suspended matter from gas which comprises an electrical precipitator having complementary extended surface and discharge electrodes defining a precipitating chamber therebetween, means for passing a stream of gas through said precipitating chamber, valve means for interrupting flow of gas through said precipitating chamber, and means actuated by said valve means for energizing said complementary electrodes only when said valve means is in closed position to establish a stationary gas sample in said precipitating chamber.

5. A device for obtaining a test precipitate of suspended matter from gas which comprises an electrical precipitator having complementary extended surface and discharge electrodes defining a precipitating chamber therebetween, means for positioning a precipitate-collecting mat adjacent to said extended surface electrode, means for passing a stream of gas through said precipitating chamber, valve means for interrupting flow of gas through said precipitating chamber, and means for cyclically opening and closing said valve means and energizing said complementary electrodes only when said valve means is in closed position to establish a stationary gas sample in said precipitating chamber.

6. A device for obtaining a test precipitate of suspended matter from gas which comprises an electrical precipitator having complementary extended surface and discharge electrodes defining a precipitating chamber therebetween, means for passing a stream of gas through said precipitating chamber, valve means for interrupting flow of gas through said precipitating chamber, and time-controlled means for successively and cyclically closing said valve means to establish a stationary gas sample in said precipitating chamber, energizing said complementary electrodes, de-energizing said complementary electrodes and opening said valve means.

7. A device for obtaining a test precipitate of suspended matter from gas which comprises an electrical precipitator having complementary extended surface and discharge electrodes defining a precipitating chamber therebetween, means for positioning a precipitate-collecting mat adjacent to said extended surface electrode, gas inlet and gas outlet means communicating with said precipitating chamber, a continuously acting fan for causing a stream of gas to be tested to flow through said precipitating chamber, a damper for interrupting flow of gas through said precipitating chamber, and time-controlled means for successively and cyclically closing said damper to interrupt flow of gas through said precipitating chamber, energizing said complementary electrodes, de-energizing said complementary electrodes and opening said damper to re-establish flow of gas through said precipitating chamber.

HARRY A. WINTERMUTE.

REFERENCES CITED

The following references are of record in the file of this patent:

UNITED STATES PATENTS

| Number | Name | Date |
|---|---|---|
| 1,096,765 | Strong | May 12, 1914 |
| 1,779,569 | Thompson | Oct. 28, 1930 |
| 2,307,602 | Penney et al. | Jan. 5, 1943 |